Dec. 24, 1963 W. DRÈVE 3,114,935
EXTRUSION METHOD AND DEVICE
Filed July 17, 1962 2 Sheets-Sheet 1

Inventor:
Wolfgang Drève
by:
Michael S. Striker
Atty

Dec. 24, 1963  W. DRÈVE  3,114,935
EXTRUSION METHOD AND DEVICE
Filed July 17, 1962  2 Sheets-Sheet 2

INVENTOR.
Wolfgang Drève
BY
Michael S. Striker
Atty ns patent 3,114,935
Patented Dec. 24, 1963

3,114,935
EXTRUSION METHOD AND DEVICE
Wolfgang Dreve, Bergstrasse 25, Unna, Germany
Filed July 17, 1962, Ser. No. 210,502
Claims priority, application Germany July 18, 1961
4 Claims. (Cl. 18—30)

The present invention relates to an extrusion method and device and, primarily but not exclusively, the present invention is concerned with a method and device for extruding thermoplastic synthetic material into molds to produce thereof artificial teeth and other prosthetic devices for dental purposes and the like.

The present invention is concerned with a cartridge or shell which may be inserted into a heated extruder and from which plastic material may be extruded into a mold for the above mentioned or other purposes.

Compressible shells are known which are inserted into the heated cylinder of an extruder and heated therein until the content of the shells, i.e. the thermoplastic material has been heated to a sufficiently plastic consistency whereupon the piston of the extruder exerts pressure on the shell, so that the heated contents thereof will be extruded, f.i., into a mold attached to the extruder.

Up to now, it was customary to fill these shells, which generally are made of aluminum, with granulated thermoplastic material. However, certain difficulties occur when proceeding in this manner. Particularly, it was found that complete and even heating of the granulated thermoplastic material takes an excessive length of time, due to the fact that the thermoplastic granules are of very low heat conductivity. It has been attempted to overcome this difficulty by reducing the diameter of the shell, however, practical considerations do not permit reduction of the shell diameter below certain limits. The same difficulties occur to an even greater extent when the compressible shell is filled with a solid body of thermoplastic synthetic material. Furthermore, the long period of time required for the even heating of the thermoplastic material to the desired elevated temperature frequently impairs the quality of the thermoplastic material.

In addition, due to the fact that the diameter of the shell had to be kept as small as possible in order to make available a relatively large heating surface, i.e., the inner surface of the shell, it became necessary to use shells of great length and thus again the extruder had to be so constructed as to accommodate shells of such great length and the piston of the extruder had to be movable in axial direction of the shell for substantially the entire length of the latter. The exaggerated length of the path of the piston, or the relatively small quantity of thermoplastic material that was thus extruded by forward movement of the piston for a given distance, retarded the extrusion process and, due to the slow progress of the extrusion of the thermoplastic material, the danger existed that the mold attached to the extruder would not be completely filled.

It is therefore an object of the present invention to overcome the above discussed difficulties and disadvantages.

It is another object of the present invention to provide a method and device by means of which the thermoplastic material can be quickly heated to the desired extrusion temperature.

It is yet another object of the present invention to provide a method and device by means of which the heated thermoplastic material can be quickly extruded in an even consistency and at an even temperature throughout.

Other objects and advantages of the present invention will become apparent from a further reading of the description and of the appended claims.

With the above and other objects in view, the present invention contemplates an insert adapted to be inserted into an extruder and from which an extruded mass is to be derived, the insert being composed of an outer deformable shell, a heat-extrudable mass in the shell, and heat-conductive means having portions distributed through the heat-extrudable mass and the portions of the heat-conductive means being displaceable towards each other during compression of the deformable shell to displace the extrudable mass therefrom, whereby upon heating of the shell in an extruder the extrudable mass in the shell may be quickly and substantially evenly heated to the temperature required for extrusion thereof due to the heat-conductive means distributed therethrough, thereby facilitating extrusion of the extrudable mass during compression of the deformable shell.

According to a preferred embodiment of the present invention, the insert which is adapted to be inserted into an extruder and from which an extruded mass is to be derived, is composed of a substantially cylindrical outer shell, a plurality of tablets of heat-extrudable synthetic material in the shell, and heat-conductive perforated discs interposed between the heat-extrudable tablets so as to be displaceable towards each other during compression of the deformable shell to displace the extrudable material therefrom, whereby upon heating of the shell in an extruder the tablets in the shell may be quickly and substantially evenly heated to the temperature required for extrusion thereof due to the heat-conductive perforated discs interposed therebetween, thereby facilitating extrusion of the extrudable mass during compression of the deformable shell.

The present invention also comprises in a method of extruding synthetic material of relatively low heat conductivity which is solid at ambient temperature and extrudable at a predetermined elevated temperature, the steps of placing the synthetic material into a compressible heat-conductive shell, distributing through the synthetic material in the compressible shell solid members of relatively high heat conductivity contacting the shell and adapted to be displaced towards each other upon compression of the latter, heating the shell and the members of relatively high heat conductivity to at least the predetermined elevated temperature in such a manner that the synthetic material also will be heated to the predetermined elevated temperature due to contact with the members of relatively high heat conductivity distributed therethrough, and compressing the shell so as to extrude therefrom the thus heated synthetic material.

Thus, the disadvantages of the prior art may be overcome according to the present invention by using in place of granulated thermoplastic material or of a solid mass of thermoplastic material filling the entire shell, preformed tablets of such thermoplastic material which, for instance, are inserted into the compressible or/and deformable shell alternatingly with perforated discs formed of a material of high heat conductivity.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
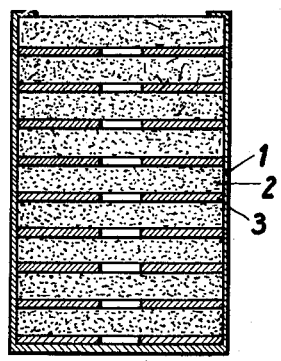
FIG. 1 is a cross sectional elevational view of a filled shell according to the present invention.
Figure 2:
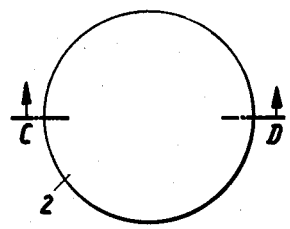
FIG. 2 is a plan view of a tablet of thermoplastic synthetic material of the type used for filling the shell of FIG. 1.
Figure 4:
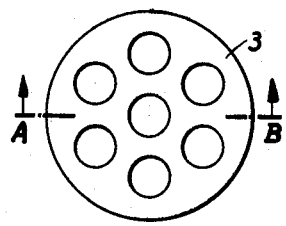
FIG. 4 is a cross sectional view of the tablet of FIG. 2, taken along in the line C—D.
Figure 3:
FIG. 3 is a plan view of one embodiment of the perforated disc which may be used in filling the shell of FIG. 1.
Figure 5:
FIG. 5 is a cross sectional view of the disc of FIG. 3, taken along the line A—B.

Referring now to the drawings and particularly to FIGS. 1 to 6, it will be seen that shell 1 is filled with alternatingly superposed tablets 2 of thermoplastic material and perforated discs 3 of a material of high heat conductivity such as a metal. Due to the fact that discs 3 consist of material of high heat conductivity and preferably contact the inner face of shell 1, it is possible by heating shell 1 from the outside also to heat discs 3 which then in turn will give up heat to tablets 2 which consist of thermoplastic material of relatively low heat conductivity. In this manner, heat is conveyed to the thermoplastic material along a relatively very large surface area and thus it is possible to heat the thermoplastic tablets substantially evenly and in a relatively short period of time. This has the further advantage that the desired temperature of the thermoplastic material can be obtained without exposing portions thereof to a substantially higher temperature than that required for extrusion of the material and thus, by preventing exposure to excessively high temperatures and by reducing the time required for heating of the thermoplastic material, deterioration of the same is prevented.

Due to the excellent heat transfer which is achieved according to the present invention, it is possible to use shells of relatively large diameter and consequently the shells can be shorter. This will permit extrusion of substantially the entire thermoplastic material contained in the shell in a shorter period of time than would be required if a shell of lesser diameter and greater length is to be used. Furthermore, during compression of the deformable shell by the pressure exerted by the piston of the extruder, the thermoplastic material will be pressed through the perforations of the discs, which perforations may or may not be aligned with each other, and thereby a further mixing of the thermoplastic material will take place so that the extruded thermoplastic material will be of highly even consistency.

Figure 7:
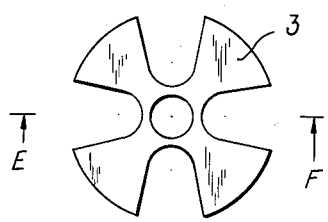
FIG. 7 is a plan view of another embodiment of a disc which may be inserted into the shell of FIG. 1.
Figure 8:
FIG. 8 is an elevational cross sectional view taken along the line E—F of FIG. 7.

The present invention is not limited to the above described embodiment. For instance, the shell need not be of circular cross section. Furthermore, the heat-conductive metal inserts may be of different configurations such as illustrated in FIGS. 7–12 of the drawing, wherein FIGS. 7 and 8 illustrate discs formed with a center opening and with peripheral cutouts.

Figure 9:
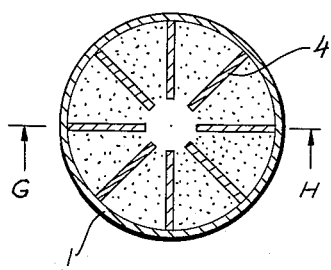
FIG. 9 is a plan view in cross section of a shell according to the present invention in which the heat-conductive discs are replaced by radial heat-conductive elements contacting the cylindrical wall of the shell.
Figure 10:
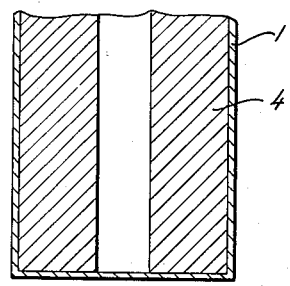
FIG. 10 is an elevational cross sectional view taken along the line G—H of FIG. 9.
Figure 11:
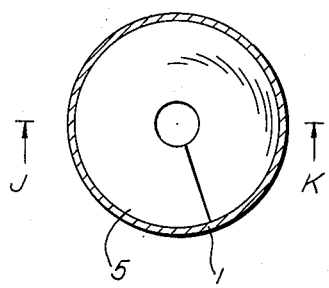
FIG. 11 is an elevational cross sectional view of another embodiment of the present invention, according to which the heat-conductive element in the shell is a helically wound band within the deformable shell.
Figure 12:
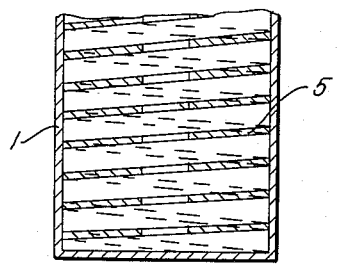
FIG. 12 is a cross sectional view taken along the line J—K of FIG. 11.

FIGS. 9 and 10 illustrate an embodiment of the present invention according to which heat conductive elements 4 extend radially inwardly from the inner wall of the deformable shell and FIGS. 11 and 12 illustrate a further embodiment according to the present invention according to which the heat conductive element 5 is formed of a helically wound band which contacts the inner wall of the deformable shell and which defines a cylindrical opening coaxial with the shell.

Figure 6:
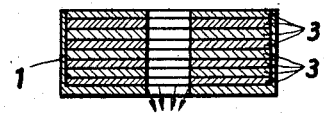
FIG. 6 is an elevational cross sectional view of the shell illustrated in FIG. 1, after the same has been compressed and the thermoplastic material has been extruded therefrom.

It will be noted that in all embodiments of the invention it is possible for the heat conductive elements to be displaced towards each other so that upon compression of the shell as illustrated in FIG. 6, the heat conductive elements, with the exception of those illustrated in FIGS. 9 and 10, will be superposed so as to substantially contact each other. The heat conductive elements of FIGS. 9 and 10, will also be compressed and will be foreshortened when subjected to the pressure of the piston of the extruder.

It is essential according to the present invention that the thermoplastic material which is extrudable at an elevated temperature is in contact with the inserts of high heat conductivity over a large surface area so as to assure even heating of the thermoplastic material to extrusion temperature in a relatively short period of time.

Shell 1, preferably consists of aluminum, or another relatively soft metal which is easily deformable. The inserts 3 of high heat conductivity preferably will be made of metals such as aluminum or brass.

Referring again to the embodiment of the present invention illustrated in FIGS. 1–6, the tablets 2 of thermoplastic material as well as heat conductive inserts 3 preferably will have diameters of between 18 and 22 mm., or even larger. The thickness of the tablets preferably will be about 3 mm., and the thickness of inserts 3 about 0.3 mm.

The tablets may be pressed, extruded or sintered of suitable thermoplastic materials, such as polycarbonates, acrylonitrile polymers, methacrylates, styrene-acrylonitrile, acetal resins, polyethylene, polypropylene and mixed polymerizates thereof.

It will be understood that each of the elements described above, or two or more together, may also find a useful application in other types of extruder inserts differing from the types described above.

While the invention has been illustrated and described as embodied in an insert adapted to be inserted into an extruder, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An insert adapted to be inserted into an extruder and from which an extruded mass is to be derived, said insert being composed of an outer deformable shell, a heat-extrudable mass in said shell, and heat-conductive means having portions distributed through said heat-extrudable mass and said portions of said heat-conductive means being displaceable towards each other during compression of said deformable shell to displace the extrudable mass therefrom, whereby upon heating of said shell in an extruder the extrudable mass in said shell may be quickly and substantially evenly heated to the temperature required for extrusion thereof due to said heat-conductive means distributed therethrough, thereby facilitating extrusion of said extrudable mass during compression of said deformable shell.

2. An insert adapted to be inserted into an extruder and from which an extruded mass is to be derived, said insert being composed of a substantially cylindrical outer deformable shell, a heat-extrudable mass of synthetic material in said shell, and heat-conductive means having portions distributed through said heat-extrudable mass and said portions of said heat-conductive means being displaceable towards each other during compression of said deformable shell to displace the extrudable mass therefrom, whereby upon heating of said shell in an extruder the extrudable mass in said shell may be quickly and substantially evenly heated to the temperature required for extrusion thereof due to said heat-conductive means distributed therethrough, thereby facilitating extrusion of said extrudable mass during compression of said deformable shell.

3. An insert adapted to be inserted into an extruder and from which an extruded mass is to be derived, said insert being composed of a substantially cylindrical outer deformable shell, a plurality of bodies of heat-extrudable mass in said shell, and heat-conductive means having portions interposed between said bodies of heat-extrudable mass and said portions of said heat-conductive means being displaceable towards each other during compression of said deformable shell to displace the extrudable mass therefrom, whereby upon heating of said shell in an extruder the extrudable mass in said shell may be quickly and substantially evenly heated to the temperature required for extrusion thereof due to said heat-conductive means distributed therethrough, thereby facilitating extrusion of said extrudable mass during compression of said deformable shell.

4. An insert adapted to be inserted into an extruder and from which an extruded mass is to be derived, said insert being composed of a substantially cylindrical outer deformable shell, a plurality of tablets of heat-extrudable synthetic material in said shell, and heat-conductive perforated discs interposed between said heat-extrudable tablets so as to be displaceable towards each other during compression of said deformable shell to displace the extrudable material therefrom, whereby upon heating of said shell in an extruder the tablets in said shell may be quickly and substantially evenly heated to the temperature required for extrusion thereof due to said heat-conductive perforated discs interposed therebetween, thereby facilitating extrusion of said extrudable mass during compression of said deformable shell.

References Cited in the file of this patent
UNITED STATES PATENTS

| | | |
|---|---|---|
| 2,287,277 | Ryder | June 23, 1942 |
| 2,338,607 | Wacker | Jan. 4, 1944 |
| 2,727,277 | Blumer | Dec. 20, 1955 |
| 2,779,972 | Kins | Feb. 5, 1957 |